Oct. 19, 1943.    V. ASARO    2,332,041
SPRING STRUCTURE
Filed April 28, 1942    2 Sheets-Sheet 2
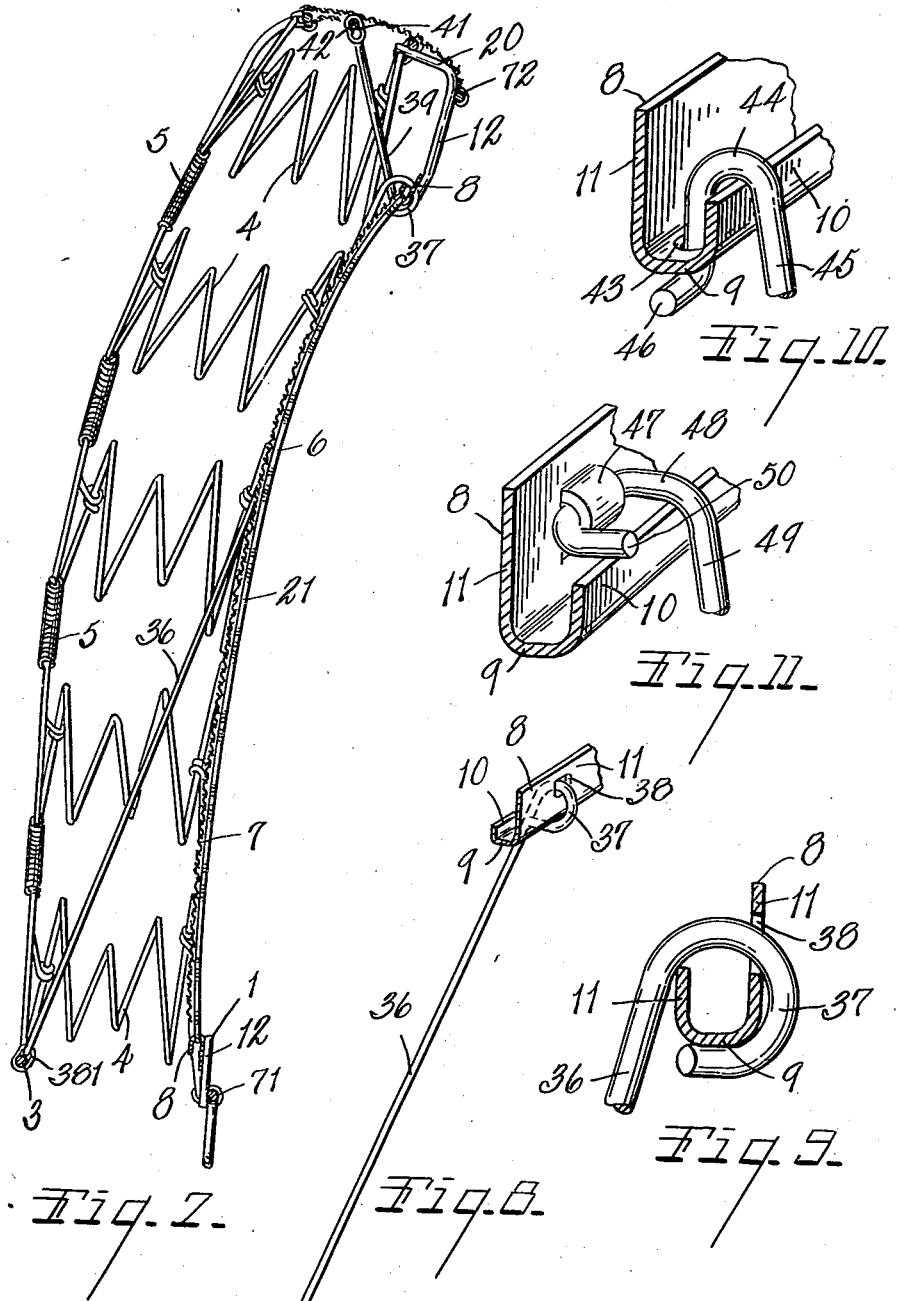
INVENTOR.
VITO ASARO
BY Earl F. Chappell
ATTORNEYS.

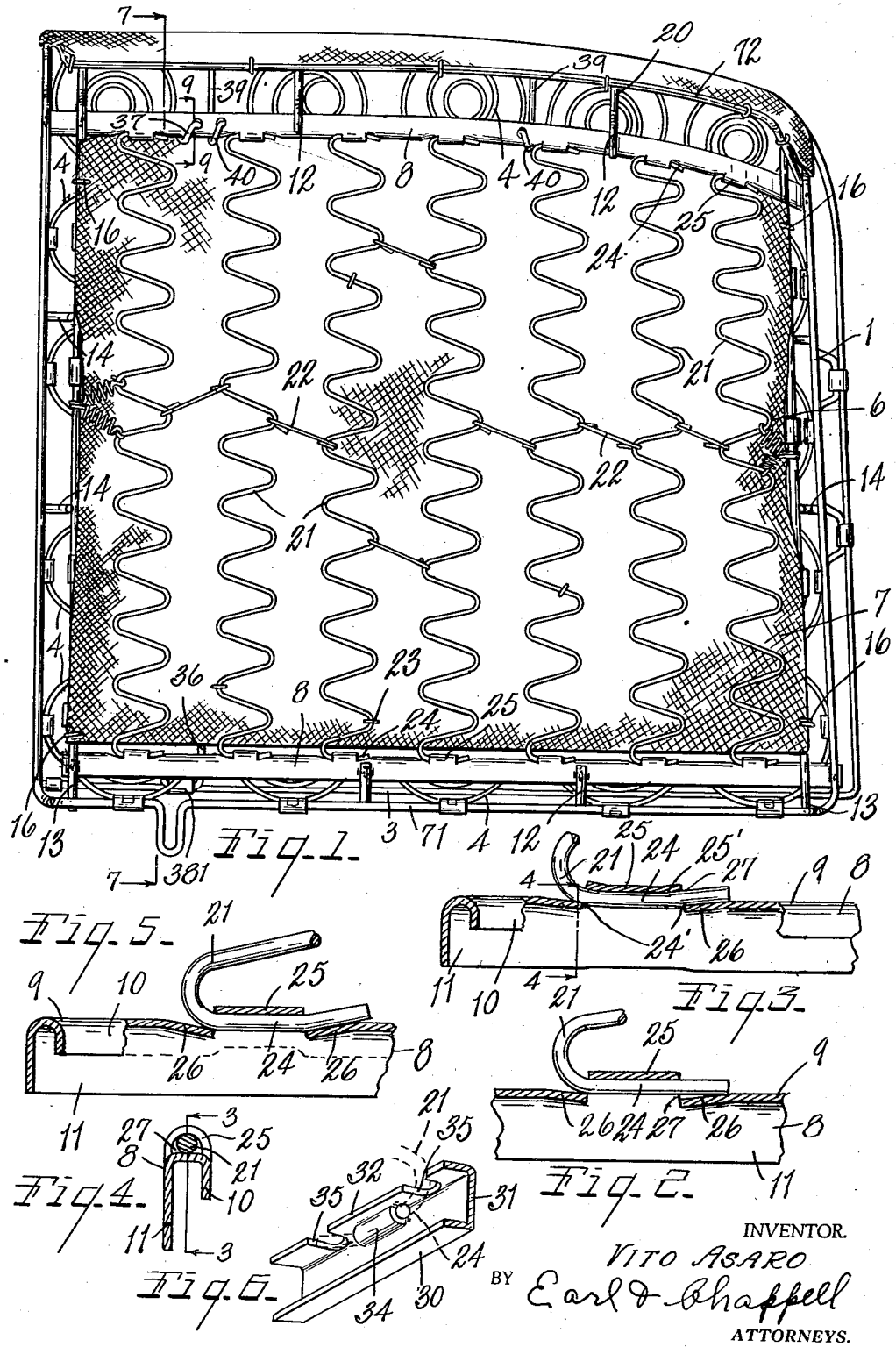

Patented Oct. 19, 1943

2,332,041

UNITED STATES PATENT OFFICE 2,332,041

SPRING STRUCTURE

Vito Asaro, Detroit, Mich., assignor to L. A. Young Spring & Wire Corporation, Detroit, Mich.

Application April 28, 1942, Serial No. 440,799

7 Claims. (Cl. 155—179)

This invention relates to improvements in spring structures.

The main objects of this invention are:

First, to provide in a spring structure embodying springs of the zigzag bowed type an improved means for attaching and supporting such springs.

Second, to provide a spring structure embodying springs of the type described in which such springs may be quickly and easily assembled and are securely held in assembled relation.

Third, to provide in a spring structure an improved supporting member or element which is economical to produce and one which permits a very rapid and easy assembling of the springs and one by which the springs are very effectively supported.

Fourth, to provide a spring structure which is well adapted for the seat backs of automobiles having the advantages above set forth and in which the parts are effectively braced and a structure which is strong and rigid even when made of relatively light material.

Objects relating to details and economies of the invention will appear from the description to follow. The invention is defined and pointed out in the claims.

Preferred embodiments of the invention are illustrated in the accompanying drawings, in which:

Fig. 1 is a bottom or rear view of a spring structure embodying the features of my invention and particularly illustrating the mounting and support members for the zigzag bowed type of springs.

Fig. 2 is an enlarged fragmentary view partially in longitudinal section illustrating one of the steps in assembling.

Fig. 3 is an enlarged fragmentary perspective view partially in longitudinal section on line 3—3 of Fig. 4 showing the zigzag spring member in its secured position in one of its supports or frame members.

Fig. 4 is a fragmentary view in section on line 4—4 of Fig. 3.

Fig. 5 is a fragmentary view partially in longitudinal section of a modified form or embodiment of my invention.

Fig. 6 is a fragmentary perspective view of still another modification or embodiment of my invention.

Fig. 7 is a vertical section on line 7—7 of Fig. 1 further showing the relation of the parts and certain bracing features of the structure.

Fig. 8 is an enlarged fragmentary perspective view illustrating the relation and connections of one of the brace members to the parts.

Fig. 9 is an enlarged fragmentary view in section on line 9—9 of Fig. 1 showing details of the connection for the brace member to one of the frame members.

Fig. 10 is a fragmentary perspective view showing a modification in the connection for the brace member to the frame member.

Fig. 11 is a fragmentary perspective view of still another modification of the brace connection to the frame member.

I have illustrated my invention as embodied in an automobile seat back structure although it will be understood that it is adaptable to various upholstery spring units or structures. I have not attempted in the accompanying drawings to show the parts in relative size or to maintain proportions.

In the embodiment illustrated the bottom frame 1 formed of heavy wire or like rod stock is generally rectangular and preferably continuous. The top frame 3 generally corresponds in shape to the bottom frame 1 and is also preferably continuous. An assembly of helically coiled springs 4 is provided, the top coils of the border springs being connected to the top border frame. The top coils of the springs of the assembly are connected by helical tie members 5. These springs are supported in the embodiment illustrated by a spring unit designated generally by the numeral 6, which is made up of a plurality of spring members 21 of the bowed zigzag type. A sheet or mat 7 is interposed between the bottom coils of the springs 4 and these spring members 21. This mat is conventionally illustrated.

These zigzag spring members are connected at their ends to the opposed supporting members 8 which are disposed in substantially parallel relation to the two opposed side reaches 71, 72 of the bottom frame 1. The members 8 are of channel section disposed with the web 9 thereof inwardly. It will be noted that in the embodiment illustrated the flange 11 is substantially wider than the top flange 10 of these members. The members 8 are supported on the adjacent sides of the frame by the tie members 12 which are welded to the corresponding frame sides and by the additional reinforcing rods 13 extending across the frame. These rods 13 are welded at their ends to the side reaches 71, 72. The rods are further supported intermediate their ends by the tie members 14 welded thereto and to the adjacent members of the frame. The mat is secured to these rods 13 as by means of the clips 16.

Referring to Fig. 7 of the embodiment illustrated, it will be noted that the border coil springs at the top of the figure are somewhat canted. In this case I prefer to support the bottom coils of these springs by clipping to the upturned end 20 on the tie members 12. This, however, is a matter depending on the shape or outline of the structure.

By reference to Fig. 1 it will be noted that the zigzag spring members 21 are disposed in spaced parallel relation and are connected at intervals by the links 22. If desired the spring members may be secured to the mat by means of clips 23. The spring members 21 are provided with terminal arms 24 which in the preferred embodiment are initially straight as shown in Fig. 2. The channel support members 8, as stated, are disposed with their webs inwardly, and these webs have spaced pairs of slits therein, the portions between the slits being offset outwardly to provide loops 25. Preferably, at the time these loops are offset, the dies also form indentations 26 at the ends of the loops which result in spaced apertures 27 through which the arms 24 may be easily inserted. After the arms 24 are inserted through the loops the loops are offset upon the arms as by means of a plier-like tool which engages the loops and the inner edge of the support members, indenting and clamping the loops upon the arms and preferably applying distorting stress thereto as shown in Fig. 3 so that the arms are in stressing engagement with the loops and also with the indented portions at the ends of the loops as indicated at 24'. The arms are somewhat sprung or distorted as indicated at 25'. This is exaggerated in the drawings as very little distortion is sufficient to secure a very effective clamping and stressing action.

By this method of assembling the straight or substantially straight arms on the springs are easily inserted through the loops and quickly secured. This method of clamping the loops upon the arms also serves to compensate for any inaccuracies in manufacture, or, in other words, great accuracy in manufacture is not required when the parts are assembled in this manner.

In Fig. 5 I illustrate a somewhat modified form or embodiment of the invention. In this case the arms 24 are preformed with an angular tip or bent portion which enables them to be inserted, but not so easily inserted, and greater accuracy is required in manufacture. In the structures shown in Figs. 2 and 3 the arms may be engaged with the loops without the aid of tools, whereas, in the embodiment shown in Fig. 5 considerable force is required to engage the arms with the loops, that is, if a close fit is provided.

In Fig. 6 I illustrate a still further modified embodiment of a supporting member 30, wherein the latter is fabricated in channel-like outline but has a somewhat wider web 31 than in the foregoing modifications. This member has spaced slits formed therein adjacent the angle or junction of web 31 with one of the flanges 32, and the metal is indented inwardly of the channel between the said slits, thereby defining the loop 34. The flange 32 is slotted at 35 in spaced relation to either end of the loop to permit the insertion of the terminal arm of a bowed spring element 21 in the manner illustrated in dotted lines in Fig. 5. In this form the slots 35 are so located with reference to the open ends of the loop 34, and the length of the flange 32 intermediate said slots and the loop end is so proportioned, that the arm 24 of the bowed spring element will have the same stressed snubbing or spring engagement at the slots and in the offset loop to maintain the element in place.

Referring to Figs. 7, 8 and 9, I have illustrated such a strut or brace construction and have designated the strut or brace by the reference numeral 36. This is a rod of wire stock extending from the top frame 3 as viewed in Fig. 7 to the right-hand supporting member 8. At the end thereof adjacent said member the rod 36 is curled into a pigtail at 37 and threaded through an aperture 38 formed in the wider flange 11 of supporting member 8, so that the member 36 passes over the edge of the narrower flange 10, then upwardly and transversely to the top frame 3 on the opposite side of the spring structure. At this point it is bent laterally 90 degrees, then reversely another 90 degrees to define a U-shaped clipping area which is secured to the frame 3 by a clip 38l. In order to eliminate likelihood of rattling due to looseness of the connection, the first mentioned right angle bend may be further bent or twisted somewhat out of parallelism with the adjacent reach of frame 3 so that when alined with the frame for clipping the strut is stressed angularly and looseness at the curled opposite end thereof is taken up.

The reference numeral 39 designates another similar but substantially shorter brace or strut which has one end thereof curled at 40 and associated with the spring supporting member 8 in the same fashion as that described above. Strut 39 extends upwardly and outwardly and is clipped at 41 to an auxiliary frame member 42 appropriately supported by upper frame 3.

As an alternative of the strut arrangement described above, the form of Fig. 10 may be employed wherein the web 9 of the channel-like supporting member 8 is provided with an aperture 43 for the reception of the terminal of the bight-like end 44 of the strut 45. The terminal extremity of the bight is bent 90 degrees at 46 to provide a lug serving to limit movement of the strut.

In Fig. 11 a still further embodiment is illustrated wherein the larger flange 11 is slitted at spaced points, then struck inwardly of the channel between the slits to define a stirrup or trunnion 47 which confines the bight-like end 48 of the strut 49. This stirrup may be made sufficiently large to enable the end 48 to be initially formed and then threaded through the stirrup, or the final bending of the extremity 50 of the bight may be effected at the time of assembly.

These modified strut constructions are assembled with the opposite frame of the structure in the manner referred to above in connection with Figs. 7, 8 and 9. All of these brace the spring structure against undue lateral sway without detracting from the resilience of the structure.

It will be apparent from the foregoing description that I have provided a bowed spring unit including an improved bowed spring structure having provisions for greatly facilitating and expediting the assembly of the bowed springs therewith and of effectively resisting their displacement therefrom. This improved support is admirably adapted for association with various types of strut or bracing elements such as are frequently found necessary in spring structures fabricated of relatively light gauge wire as in the present case. The whole structure is inexpensive, light in weight, satisfactorily stable and resistant to lateral sway, and above all highly resilient in its action. It may be fabricated quickly and easily by unskilled workmen with perfect uniformity of result.

Embodiments of the invention which incorporate the principles of the invention in a highly desirable manner have been illustrated and described. It should be understood that the foregoing terminology is used only descriptively rather than in a limiting sense, and with full intention to include equivalents of the features shown and described, within the scope of the following claims.

Having thus described my invention what I claim as new and desire to secure by Letters Patent is:

1. In a spring structure, the combination with bowed zigzag springs provided with initially straight terminal arms, of supporting members of channel section disposed in opposed relation with the webs thereof inwardly, the webs of said supporting members having a longitudinally spaced series of spaced coacting pairs of transverse slits thereacross, the webs between the coacting pairs of slits being outwardly offset and constituting loops, portions of the webs at the ends of the loops being indented, said terminal arms of the springs being disposed through the loops and beyond the opposite ends of the loops for engaging said indented portions, and the loops being clamped upon said arms whereby the arms are in stressing engagement therewith and with said indented portions at the ends of the loops.

2. In a spring structure, the combination with bowed zigzag springs provided with terminal arms, of supporting members of channel section disposed in opposed relation with the webs thereof inwardly, the webs of said supporting members having a longitudinally spaced series of spaced coacting pairs of transverse slits thereacross, the webs between the coacting pairs of slits constituting loops adapted to receive said arms, said terminal arms of the springs being disposed through the loops and beyond the opposite ends of the loops for engaging the web and being in stressing engagement with the loops and with the web at the ends of the loops.

3. A generally rectangular spring structure comprising bowed zigzag springs provided with terminal arms, and a supporting member of channel section disposed with the webs thereof inwardly, the web of said supporting member having longitudinally spaced arm receiving loops struck therefrom, said terminal arms of the springs being disposed through the loops and beyond the opposite ends of the loops to engage the web and being in stressing engagement with the loops and with the web at the ends of the loops.

4. In a spring structure, the combination with bowed zigzag springs provided with terminal arms, of a supporting member of channel section disposed with the web thereof inwardly, the web of said supporting member having a longitudinally spaced series of spaced coacting pairs of transverse slits thereacross, the portions of the webs between the coacting pairs of slits constituting offset loops, portions of the web at the ends of the loops providing camming portions, said terminal arms of the spring members being disposed through the loops in stressing engagement therewith and with said camming portions.

5. A supporting member for springs provided with a terminal arm, the supporting member being of channel section and having a longitudinally spaced series of spaced outwardly offset loops with which terminal arms of springs may be engaged, and the portions of the web at the ends of the loops being indented, with cam-like surfaces to facilitate the insertion of the arm into and through a loop and to engage the end portions of the arm after insertion, to retain the arm in the loop.

6. A supporting member for springs provided with a terminal arm, the supporting member being of channel section and having a longitudinally spaced series of spaced connecting pairs of slits across the web thereof, the portions of the web between the coacting pairs of slits constituting loops with which terminal arms of springs may be engaged, and the portions of the web at the ends of the loops being indented, with cam-like surfaces to facilitate the insertion of the arm into and through a loop and to engage the end portions of the arm after insertion, to retain the arm in the loop.

7. A supporting member for springs provided with a terminal arm, the supporting member being of channel section and having a longitudinally spaced series of spaced coacting pairs of slits across the web thereof, the portions of the web between the coacting pairs of slits constituting loops with which terminal arms of springs may be engaged, and the portions of the web at the ends of the loops being indented providing open ends for the loops and means for supporting the arms of springs engaged with the loops under stress.

VITO ASARO.